US012503857B1

(12) United States Patent
Keller

(10) Patent No.: US 12,503,857 B1
(45) Date of Patent: Dec. 23, 2025

(54) SYSTEM FOR CONTROLLING RAIN WATER FLOW

(71) Applicant: Paul Hyman Keller, Midlothian, VA (US)

(72) Inventor: Paul Hyman Keller, Midlothian, VA (US)

( * ) Notice: Subject to any disclaimer, the term of this patent is extended or adjusted under 35 U.S.C. 154(b) by 0 days.

(21) Appl. No.: 18/747,820

(22) Filed: Jun. 19, 2024

(51) Int. Cl.
*E04D 13/08* (2006.01)
*E04D 13/064* (2006.01)
*G05D 9/02* (2006.01)

(52) U.S. Cl.
CPC ....... *E04D 13/0645* (2013.01); *E04D 13/064* (2013.01); *G05D 9/02* (2013.01); *E04D 2013/0853* (2013.01); *E04D 2013/0873* (2013.01); *Y10T 137/267* (2015.04); *Y10T 137/7316* (2015.04); *Y10T 137/7339* (2015.04); *Y10T 137/7355* (2015.04)

(58) Field of Classification Search
CPC ........ E04D 13/0645; E04D 2013/0853; E04D 2013/0873; Y10T 137/267; Y10T 137/7316; Y10T 137/7339; Y10T 137/7355; G05D 9/02
See application file for complete search history.

(56) References Cited

U.S. PATENT DOCUMENTS

| | | | | |
|---|---|---|---|---|
| 1,179,270 A * | 4/1916 | Beinke | E04D 13/08 | 137/120 |
| 1,410,441 A * | 3/1922 | Wrigley | E03B 3/02 | 137/120 |
| 2,158,309 A * | 5/1939 | Salisbury | E04D 13/08 | 137/120 |
| 2,567,004 A * | 9/1951 | Benck | E04D 13/08 | 239/521 |
| 10,253,503 B2 * | 4/2019 | Greenberg | E04D 13/076 | |

FOREIGN PATENT DOCUMENTS

| | | | |
|---|---|---|---|
| EP | 1469138 A1 * | 10/2004 | E03B 3/03 |
| WO | WO-2011058495 A1 * | 5/2011 | E04D 13/08 |

* cited by examiner

*Primary Examiner* — Kevin F Murphy
(74) *Attorney, Agent, or Firm* — Ted Masters

(57) ABSTRACT

A system for controlling rain water flow includes a container having a top end and an opposite bottom end. A drain tube having a drain port is connected to the container. A cover tube slidably receives the drain tube. A magnetic latch is disposed between the drain tube and the cover tube. The system includes a fill configuration in which the magnetic latch is magnetically engaged and the cover tube covers and seals the drain port of the drain tube. The system also includes a drain configuration in which the magnetic latch is magnetically disengaged and the drain tube slides downward to expose the drain port.

13 Claims, 10 Drawing Sheets

SYSTEM FOR CONTROLLING RAIN WATER FLOW

CROSS REFERENCE TO RELATED APPLICATION

None

TECHNICAL FIELD

The present invention pertains generally to controlling the flow of water, and more particularly to a system which controls the flow of rain water from a gutter.

BACKGROUND OF THE INVENTION

Rain chains are known in the art. |These devices are a decorative substitute for the conventional enclosed gutter downspouts. The chains hang down from the gutter and direct rain water into a collection vessel such as an urn or simply onto the ground.

BRIEF SUMMARY OF THE INVENTION

The present invention is directed to a system for controlling rain water flow. The system hangs from the gutter of a structure. Rain water from the gutter outlet flows into a container of the system. When the weight of the collected rain water reaches a certain value, a magnetic latch is disengaged and water is discharged in a tight downward vertical stream to a collection vessel such as an urn disposed below.

When sufficient rain water has drained out of the container the container becomes light enough so that a spring can pull the container back up and again engage the magnetic latch. The container then fills again and the cycle is repeated so long as rain water is available. The system provides an interesting and aesthetically pleasing alternative to conventional downspouts or rain chains.

While the system is primarily designed for controlling rain water flow, other water flow applications are possible.

In accordance with an embodiment, a system for controlling rain water flow includes a container which has a top end and an opposite bottom end. A drain tube having a drain port is connected to the container. A cover tube slidably receives the drain tube. A magnetic latch periodically connects the drain tube and the cover tube. The system has a fill configuration in which the magnetic latch is magnetically engaged and the cover tube covers and seals the drain port of the drain tube. The system also has a drain configuration in which the magnetic latch is magnetically disengaged and the drain tube slides downward to expose the drain port.

In accordance with another embodiment, a seal is disposed at the bottom end of the container. The cover tube has a bottom end which in the fill configuration abuts the seal.

In accordance with another embodiment, the magnetic latch includes (1) the cover tube having a top end and an opposite bottom end, a magnetic adjustment screw is disposed at the top end of the cover tube, and (2) the drain tube having a top end and an opposite bottom end, the a magnet is disposed at the top end of the drain tube. In the fill configuration the adjustment screw and the magnet are magnetically engaged. In the drain configuration the adjustment screw and the magnet are magnetically disengaged.

In accordance with another embodiment, the magnetic adjustment screw is positionable toward the magnet to increase magnetic attraction and increase flow of the rain water. Conversely, the magnetic adjustment screw is positionable away from the magnet to decrease magnetic attraction and decrease flow of the rain water.

In accordance with another embodiment, the cover tube has a top end. A spring is connected between the top end of the cover tube and the bottom of the container. The spring biases the container in an upward direction.

In accordance with another embodiment, the cover tube has a top end. A distance limiter is connected between the top end of the cover tube and the bottom end of the container. The distance limiter limits a downward distance travelled by the drain tube.

In accordance with another embodiment, the system continuously cycles between the fill configuration and the drain configuration.

In accordance with another embodiment, a container is vertically positionable to an up position and to a down position. A drain port us connected to the container, the drain port being covered when the container is in the up position, and the drain port being exposed when the container is in the down position; A magnetic latch magnetically holds the container in the up position. In a fill configuration in the magnetic latch is magnetically engaged and the container can fill with the rain water. In a drain configuration the magnetic latch is magnetically disengaged and the rain water can drain from the container.

In accordance with another embodiment, a container is vertically positionable to an up position and to a down position. A drain port is connected to the container, the drain port being covered when the container is in the up position, and the drain port being exposed when the container is in the down position; A magnetic latch is positionable to a mechanically engaged position wherein the container is disposed in the up position and the container can fill with rain water. The magnetic latch is positionable to a magnetically disengaged position wherein the container is disposed in the down position and rain water can drain from the container.

Other embodiments, in addition to the embodiments enumerated above, will become apparent from the following detailed description, taken in conjunction with the accompanying drawings, which illustrate, by way of example, the principles of the system for controlling rain water flow.

BRIEF DESCRIPTION OF THE DRAWINGS

FIG. 1 is a perspective view of the system;

DETAILED DESCRIPTION OF THE INVENTION

Figure 1:
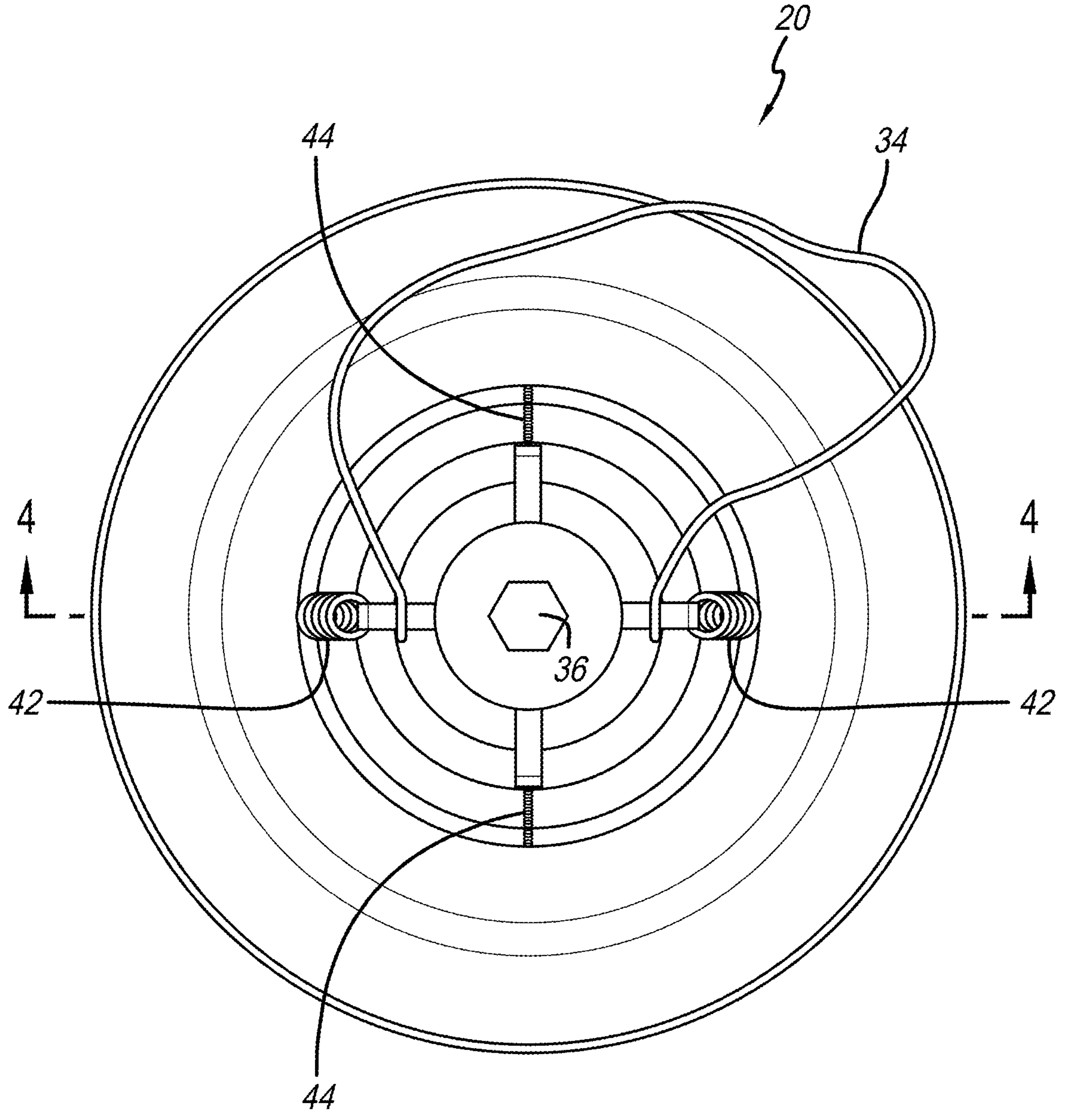
FIG. 1 is a top plan view of a system for controlling the flow of rain water.
Figure 2:
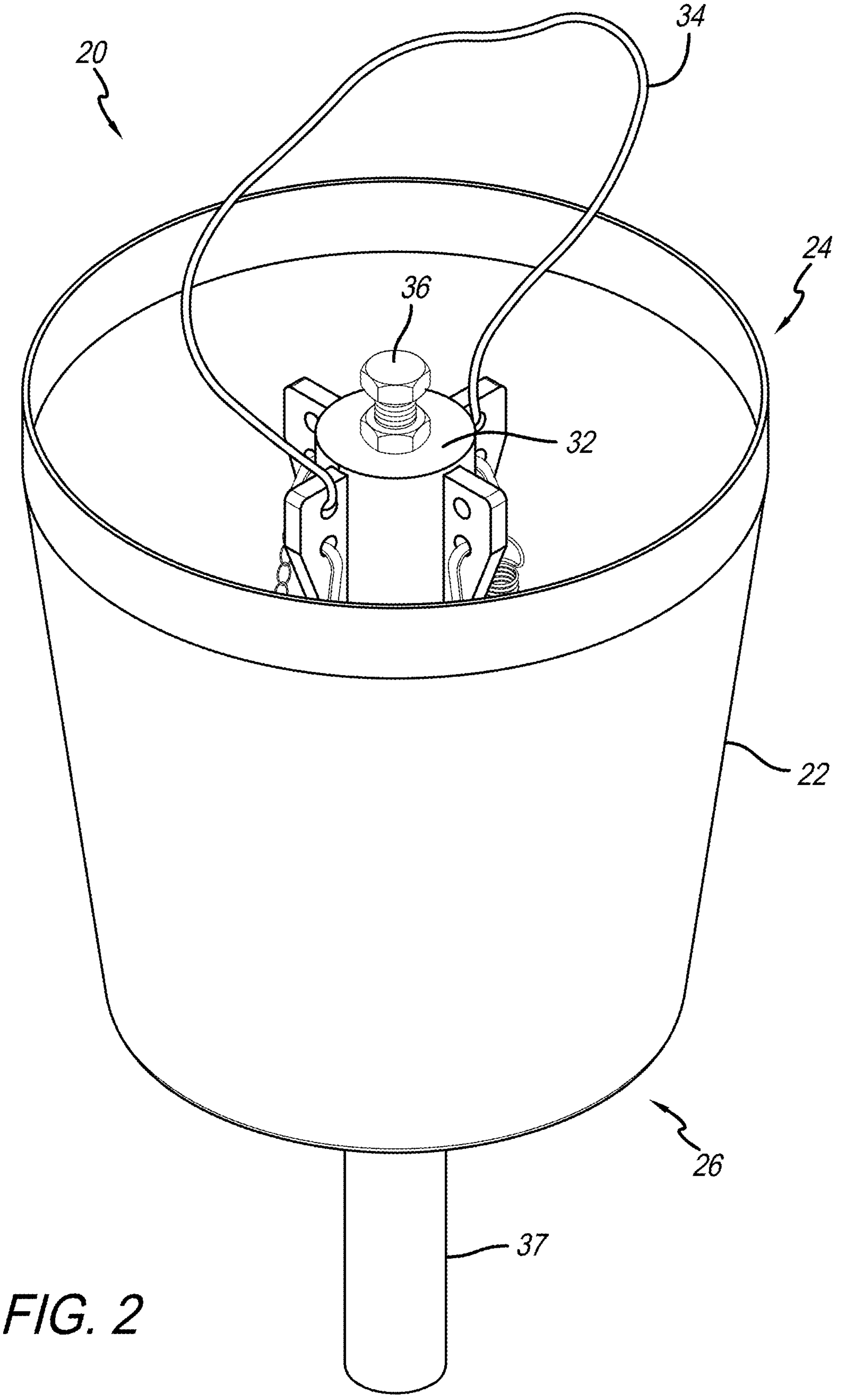
Figure 3:
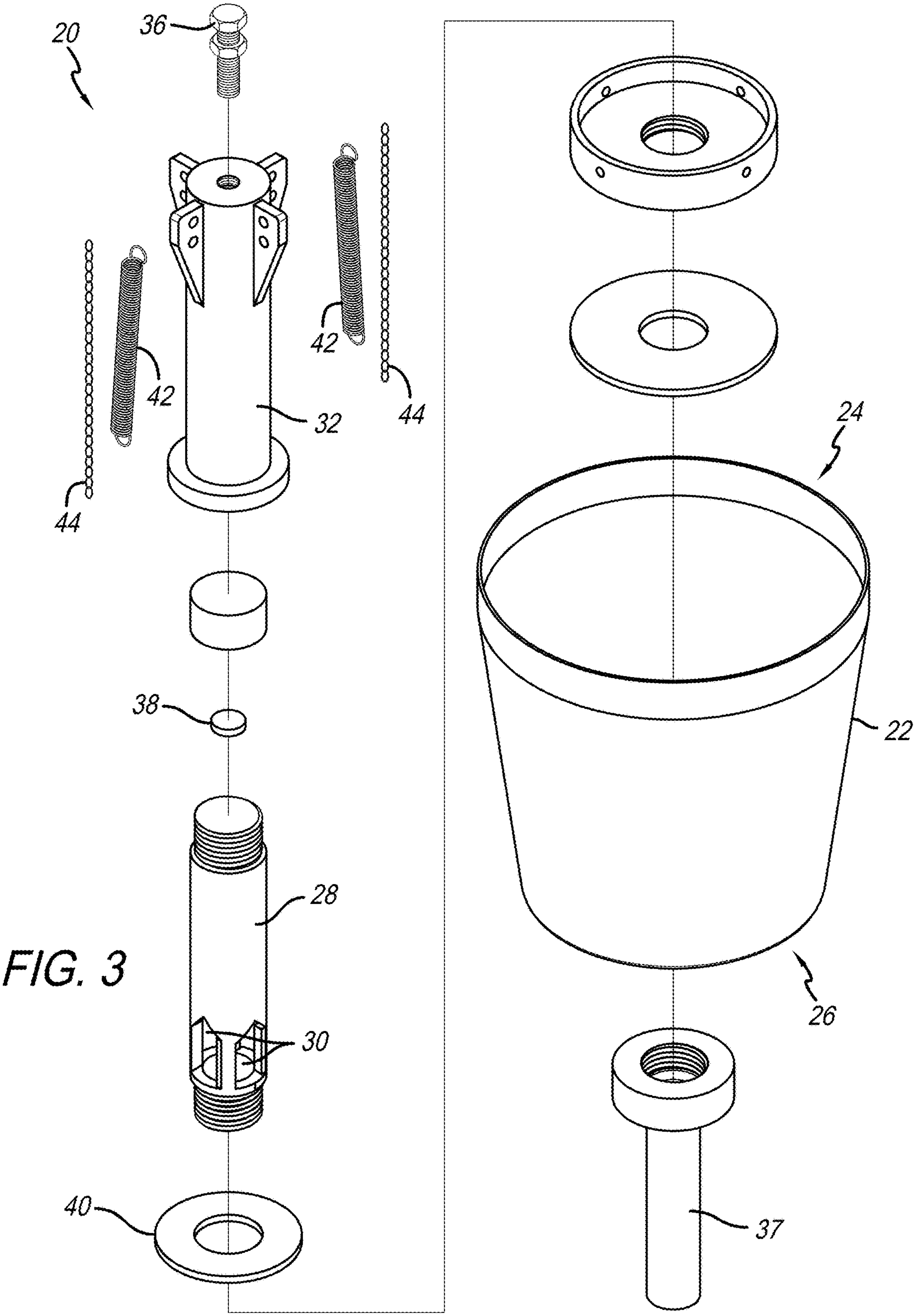
FIG. 3 is a reduced exploded view of the system.

Referring initially to FIGS. 1-8 there are shown several views of a system for controlling rain water 500 flow, the system generally designated as 20. System 20 includes a container 22 (such as a bucket) for collecting the rain water 500. Container 22 has a top end 24 (a mouth for receiving rain water 500) and an opposite bottom end 26 (a base and components attached closely thereto). A drain tube 28 having a drain port 30 is connected to the bottom end 26 of container 22 and upwardly projects therefrom. Drain port 30 is an opening in drain tube 28 which allows water to drain from system 20. In the shown embodiment there are four drain ports 30 separated by thin sections of drain tube 28 (refer to FIG. 3). In an embodiment container 22 is 6.5 inches deep and has a 6 inch diameter mouth.

A cover tube 32 slidably receives drain tube 28, wherein drain tube 28 slides up and down with respect to cover tube 32 which is stationary when system 20 is in use. To that end, a hanger 34 (such as the shown loop) is connected to cover tube 32, and hanger 34 is connected to the gutter 600 (refer to FIGS. 9 and 10).

System 20 further includes a magnetic latch which periodically connects drain tube 28 and cover tube 32. In the shown embodiment, the magnetic latch includes (1) cover tube 32 having a top end and an opposite bottom end, a magnetic adjustment screw 36 (made of a magnetic material such as steel) is disposed at the top end of cover tube 32, and (2) drain tube 28 having a top end and an opposite bottom end, a magnet 38 is disposed at the top end of drain tube 28. In an embodiment magnet 38 is a neodymium magnet N42SH, ¼" thick×¾" dia. Pull force 12.8 lbs.

Figure 4:
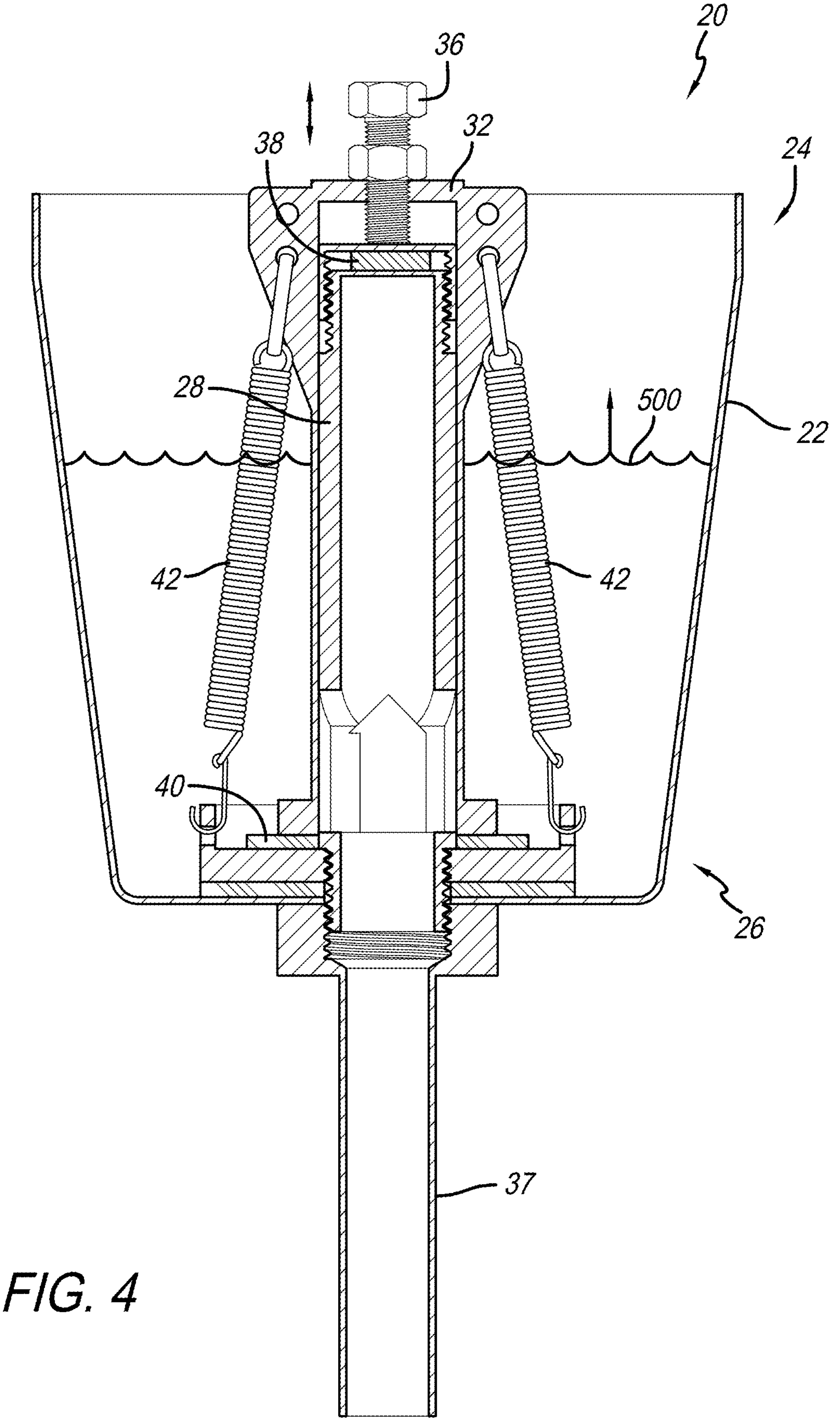
FIG. 4 is a cross sectional view along the line 4-4 of FIG. 1 showing the system in a fill configuration.
Figure 6:
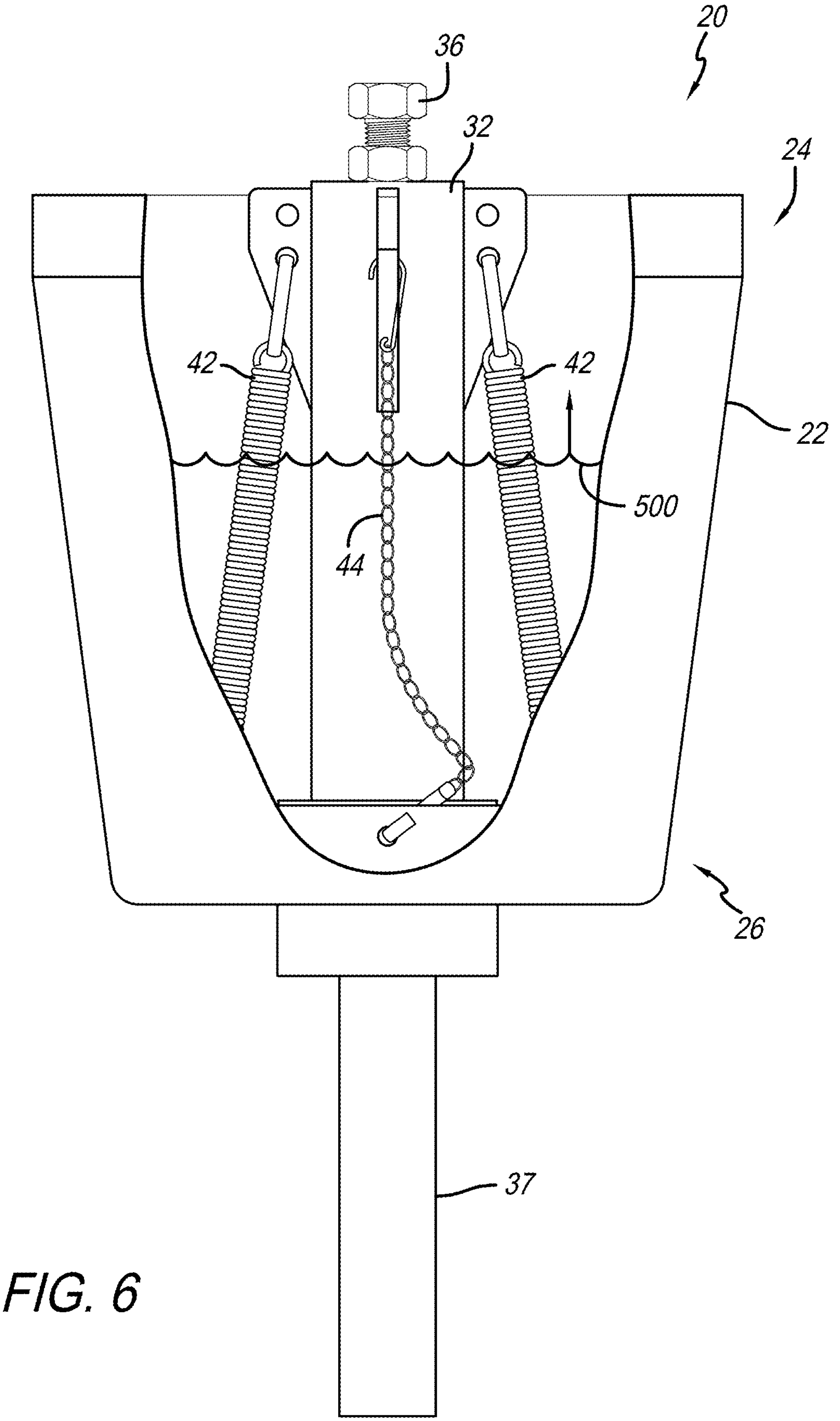
FIG. 6 is an elevation cutaway view of the system in the fill configuration.

Referring to FIGS. 4 and 6, system 20 includes a fill configuration in which the magnetic latch is magnetically engaged and cover tube 32 covers and seals drain port 30 of drain tube 28 (refer to FIGS. 4 and 6). That is, magnetic adjustment screw 36 and magnet 38 are magnetically engaged (magnetically pulled together) wherein the magnetic attraction of magnet 38 and magnetic adjustment screw 36 cause fill tube 28 (and container 22) to be pulled and remain up. System 20 further incudes a downspout 37 which directs the rain water 500 in a downward stream. When in the fill configuration rain water 500 fills container 22.

Figure 5:
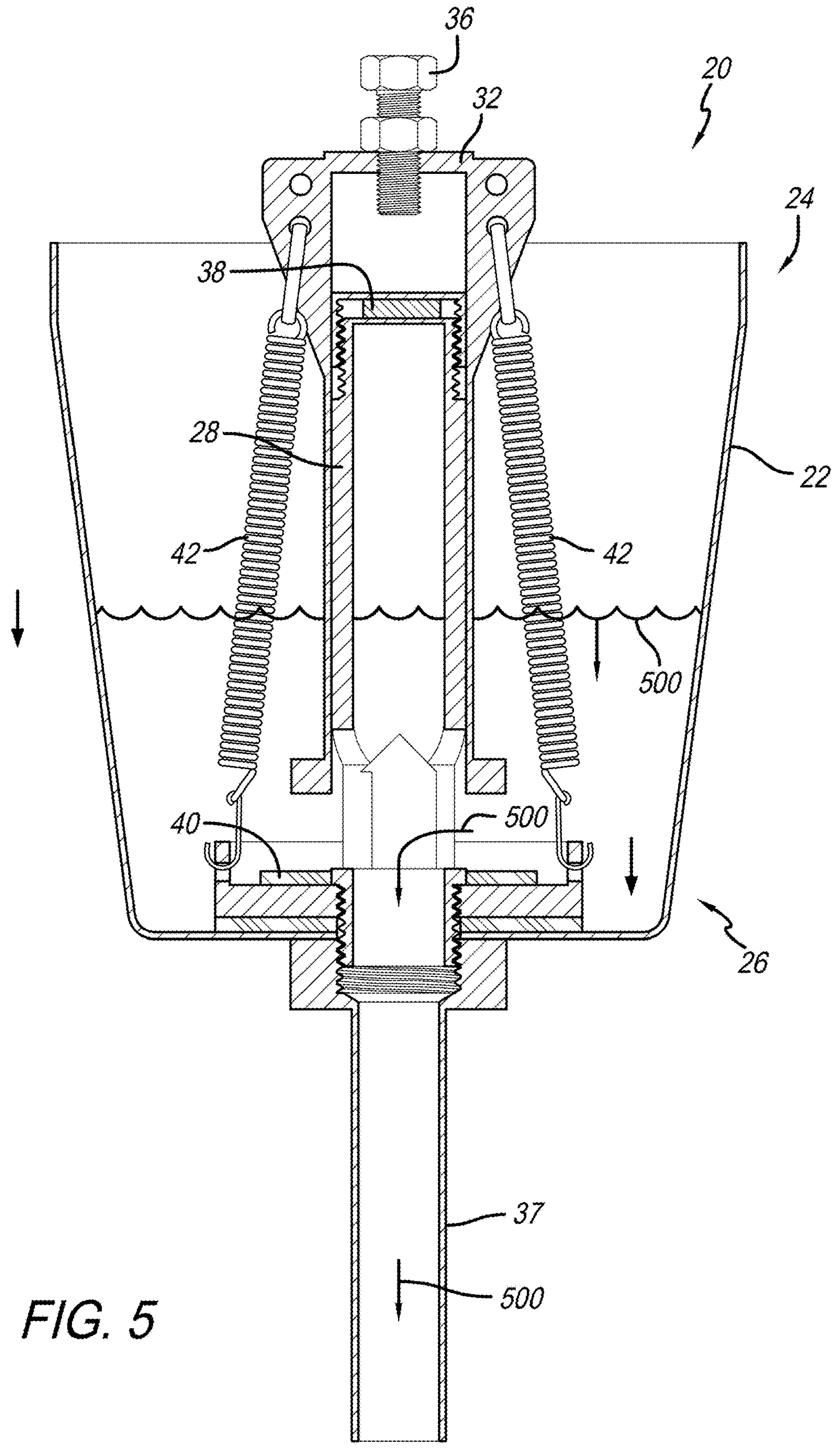
FIG. 5 is a cross sectional view as in FIG. 4 showing the systemin a drain configuration.
Figure 7:
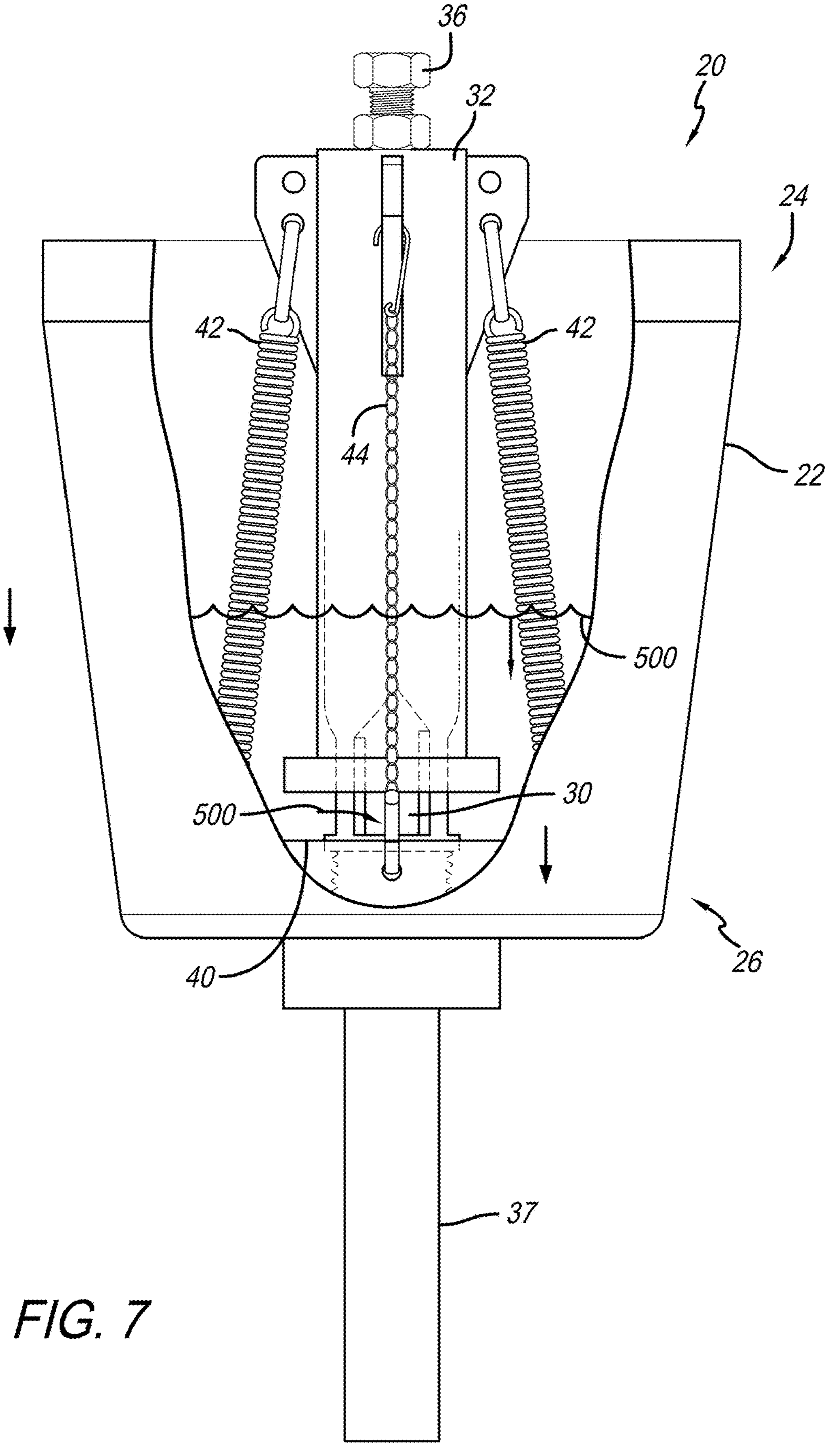
FIG. 7 is an elevation cutaway view of the system in the drain configuration.
Figure 8:
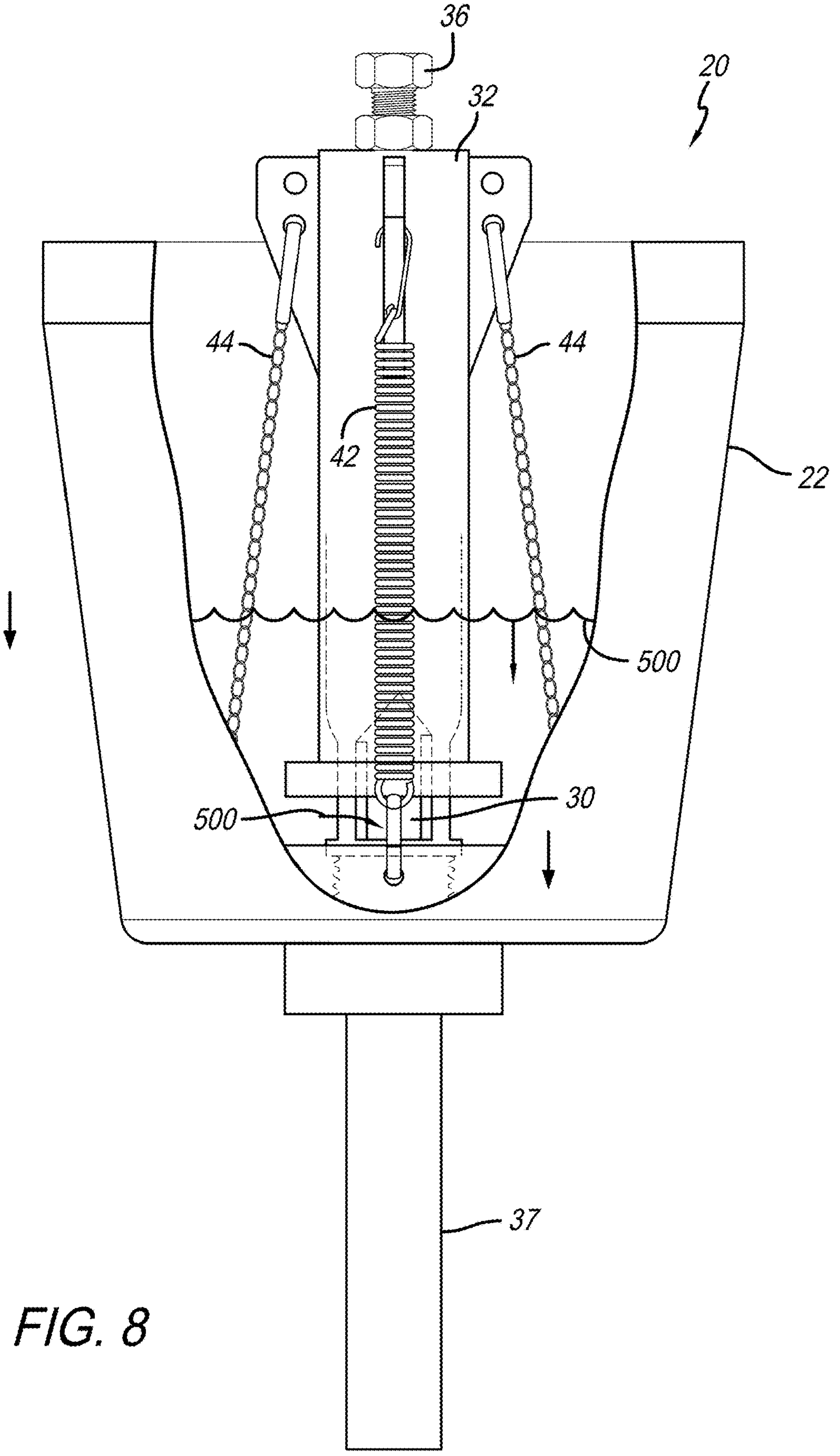
FIG. 8 is an elevation cutaway view of the system rotated 90 degrees from FIG. 7.

Referring to FIGS. 5, 7, and 8 system 20 also includes a drain configuration in which the magnetic latch is magnetically disengaged and drain tube 28 slides down to expose drain port 30 (refer to FIGS. 5 and 7). That is, magnetic adjustment screw 36 and magnet 38 are disengaged so drain tube 28 can slide down with respect to cover tube 32 to expose drain port 30 and allow water to drain from container 22. After a sufficient amount of rain water 500 drains from container 22 and the weight of the container is less, a spring (see discussion below) urges container 22 with drain tube 28 up until magnetic latch 32 again engages. The fill/drain cycle is then repeated. That is, system 20 continuously cycling between the fill configuration and the drain configuration. When in the drain configuration rain water 500 drains out of container 22 and through downspout 37 as is shown by the arrows. In an embodiment it takes about 16 ounces of rain water 500 to disengage the magnetic latch and trigger the drain configuration.

Magnetic adjustment screw 36 creates the ability to increase or decrease the magnetic bond with magnet 38. This in turn increases or decreases the amount of water 600 needed to transition from the fill configuration to the drain configuration. For example referring to FIG. 4, if magnetic adjustment screw 36 is screwed downward with respect to cover tube 32 and magnet 38, the magnetic attraction with magnet 38 will increase and it will take more rain water 500 to initiate the drain cycle. This will cause system 20 to cycle less frequently, and to release a larger flow of rain water 500 upon discharge.

Conversely, if magnetic adjustment screw 36 is screwed upward with respect to cover tube 32 and magnet 38, the magnetic attraction with magnet 38 will decrease and it will take less rain water 500 to initiate the drain cycle. This will cause system 20 to cycle more frequently, and to release a smaller flow of rain water 500 upon discharge.

To effect the sealing of drain port 30 of drain tube 28 in the fill configuration, a seal 40 is disposed at bottom end 26 of container 22. Cover tube 32 has a bottom end which abuts seal 40 in the fill configuration. In the shown embodiment a flange is disposed at the bottom end of cover ube 32, the flange abuts seal 40 (refer to (FIGS. 4 and 6).

1. A spring 42 is connected between top end of cover tube 32 and the bottom end 26 of container 22. In the shown embodiment two springs 42 are utilized. Spring 42 biases container 22 in an upward direction. Spring 42 pulls container 22 up when the weight of the rain water 500 is reduced through draining, so that magnetic latch 36 can engage to start the next fill cycle (refer to FIGS. 4 and 6). It is noted that in FIGS. 4 and 6 springs 42 are not shown in cross section for clarity. In an embodiment spring 42 is an extension spring 0.25"×3.25"×0.025".

Referring to FIGS. 5, 7, and 8 system 20 further includes a distance limiter 44 (such as a chain) connected between the top end of cover tube 32 and the bottom end 26 of container 22 (two distance limiters in the shown embodiment). Distance limiter 44 limits the downward distance travelled by container 22 and drain tube 30 in the drain configuration.

Figure 9:
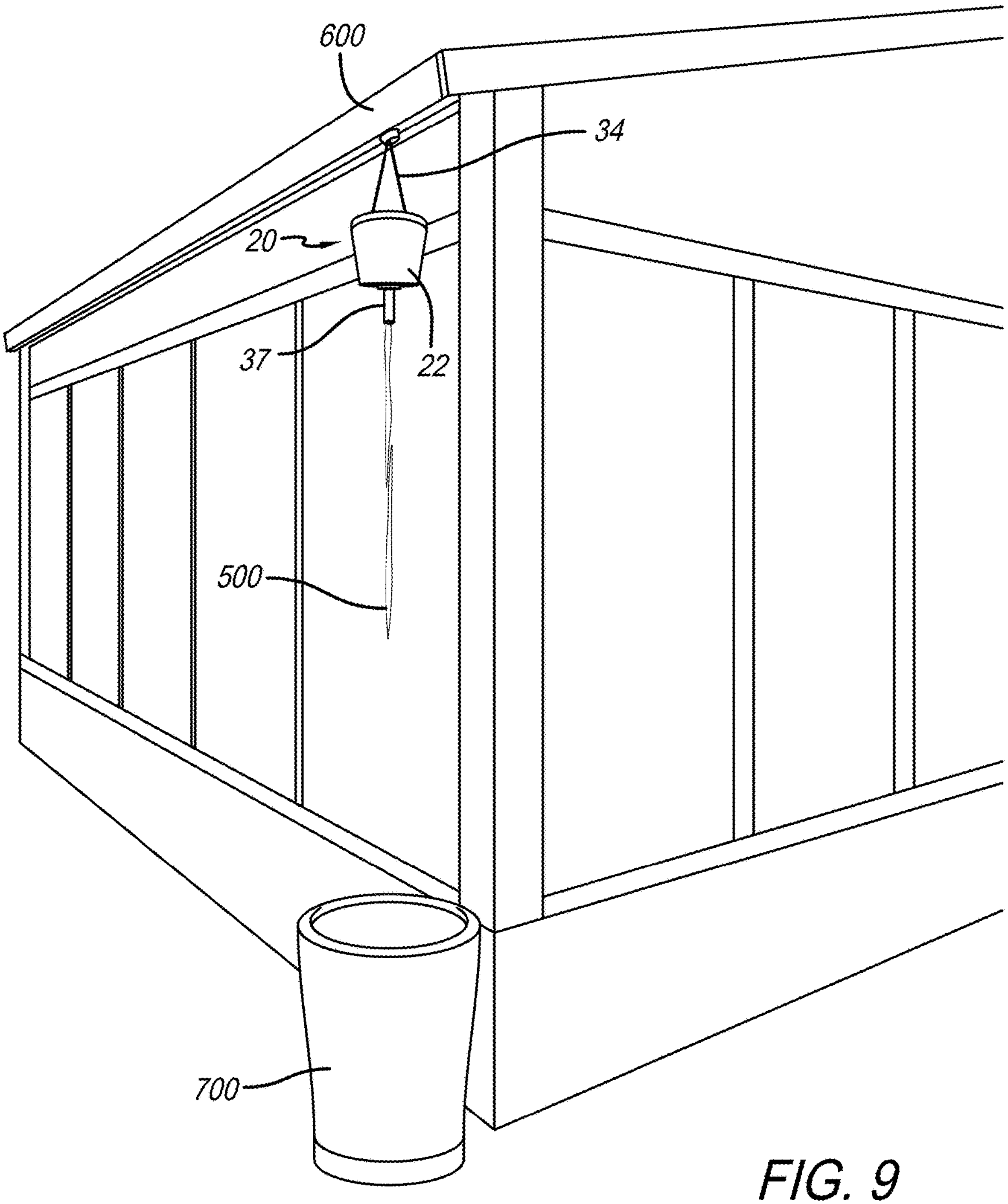
FIG. 9 is a reduced perspective view of the system installed on a gutter; and, FIG. 10 is a reduced perspective of the system with a decorative cover.
Figure 10:
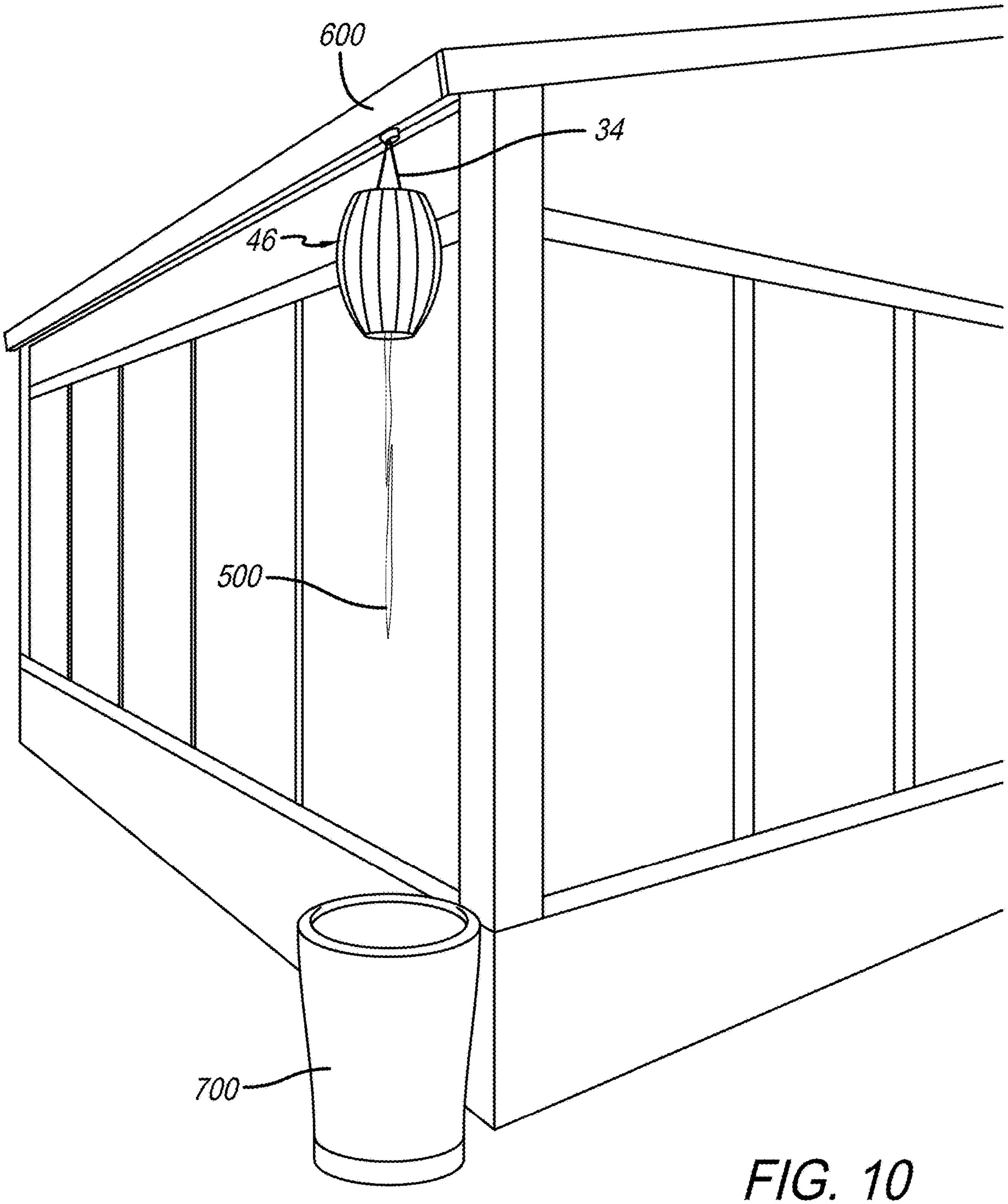

Referring now to FIGS. 9 and 10, there are illustrated reduced perspective views of system 20 installed on a gutter 600, and the system with a decorative cover. A structure has a rain gutter 600. System 20 is connected to rain gutter 600 so that the rain water 500 flows into container 22. As discussed above the connection is made using a hanger 34 connected to cover tube 32. Rain water 500 flows out of a downspout 37 connected to the bottom of container 22, and in the shown embodiment into an urn is disposed beneath system 20. In FIG. 10 a decorative cover 46 surrounds s system 20. In an embodiment the cover 46 is illuminated such as by solar lights.

The embodiments of the system for controlling rain water flow described herein are exemplary and numerous modifications, combinations, variations, and rearrangements can be readily envisioned to achieve an equivalent result, all of which are intended to be embraced within the scope of the appended claims. For example, container size, magnets, and springs can be selected to achieve any desired operational result. Further, nothing in the above-provided discussions of the system should be construed as limiting the invention to a particular embodiment or combination of embodiments. The scope of the invention is defined by the appended claims.

I claim:

1. A system for controlling rain water flow comprising:

a container having a top end and an opposite bottom end;

a drain tube connected to said container, said drain tube having a drain port;

a cover tube which slidably receives said drain tube;

a magnetic latch which periodically connects said drain tube and said cover tube;

a fill configuration in which said magnetic latch is magnetically engaged and said cover tube covers and seals said drain port of said drain tube; and, a drain configuration in which said magnetic latch is magnetically disengaged and said drain tube slides downward to expose said drain port.

2. The system according to claim 1 further including:
a seal disposed at said bottom end of said container; and,
said cover tube having a bottom end which in said fill configuration abuts said seal.

3. The system according to claim 1 further including:
said magnetic latch including (1) said cover tube having a top end and an opposite bottom end, a magnetic adjustment screw disposed at said top end of said cover tube, and (2) said drain tube having a top end and an opposite bottom end, a magnet disposed at said top end of said drain tube;
in said fill configuration said adjustment screw and said magnet being magnetically engaged; and,
in said drain configuration said adjustment screw and said magnet being magnetically disengaged.

4. The system according to claim 3 further including:
said magnetic adjustment screw positionable toward said magnet to increase magnetic attraction; and,
said magnetic adjustment screw positionable away from said magnet to decrease magnetic attraction.

5. The system according to claim 1 further including:
said cover tube having a top end;
a spring connected between said top end of said cover tube and said bottom end of said container; and,
said spring biasing said container in an upward direction.

6. The system according to claim 1 further including:
said cover tube having a top end;
a distance limiter connected between said top end of said cover tube and said bottom end of said container; and,
said distance limiter limiting a downward distance travelled by said drain tube.

7. The system according to claim 1 further including:
said system continuously cycling between said fill configuration and said drain configuration.

8. The system according to claim 1, the system cooperating with a rain gutter, the system further including:
a hanger connected to said cover tube; and,
said hanger connected to the rain gutter.

9. The system according to claim 1 further including:
an ornamental cover which surrounds said system.

10. The system according to claim 1 further including:
a seal disposed at said bottom end of said container;
said cover tube having a bottom end which in said fill configuration abuts said seal;
said magnetic latch including (1) said cover tube having a top end and an opposite bottom end, a magnetic adjustment screw disposed at said top end of said cover tube, and (2) said drain tube having a top end and an opposite bottom end, a magnet disposed at said top end of said drain tube;
in said fill configuration said adjustment screw and said magnet being magnetically engaged;
in said drain configuration said adjustment screw and said magnet being magnetically disengaged;
said magnetic adjustment screw positionable toward said magnet to increase magnetic attraction;
said magnetic adjustment screw positionable away from said magnet to decrease magnetic attraction;
a spring connected between said top end of said cover tube and said bottom end of said container;
said spring biasing said container in an upward direction;
a distance limiter connected between said top end of said cover tube and said bottom end of said container;
said distance limiter limiting a downward distance travelled by said drain tube; and,
said system continuously cycling between said fill configuration and said drain configuration.

11. A system for controlling rain water flow comprising
a container which is vertically positionable to an up position and to a down position;
a drain port connected to said container, said drain port being covered when said container is in said up position, and said drain port being exposed when said container is in said down position;
a magnetic latch which magnetically holds said container in said up position;
a fill configuration in which said magnetic latch is magnetically engaged and said container can fill with the rain water; and,
a drain configuration in which said magnetic latch is magnetically disengaged and the rain water can drain from said container.

12. The system according to claim 11 further including:
a spring connected to said container, said spring urging said container to said up position.

13. A system for controlling rain water flow comprising
a container which is vertically positionable to an up position and to a down position;
a drain port connected to said container, said drain port being covered when said container is in said up position, and said drain port being exposed when said container is in said down position;
a magnetic latch positionable to a mechanically engaged position wherein said container is disposed in said up position and said container can fill with rain water; and,
said magnetic latch positionable to a magnetically disengaged position wherein said container is disposed in said down position and rain water can drain from said container.

* * * * *